Oct. 10, 1967   F. E. PARSONS   3,346,271
NESTABLE CART OF MOLDED MATERIAL
Filed July 6, 1965   3 Sheets-Sheet 2
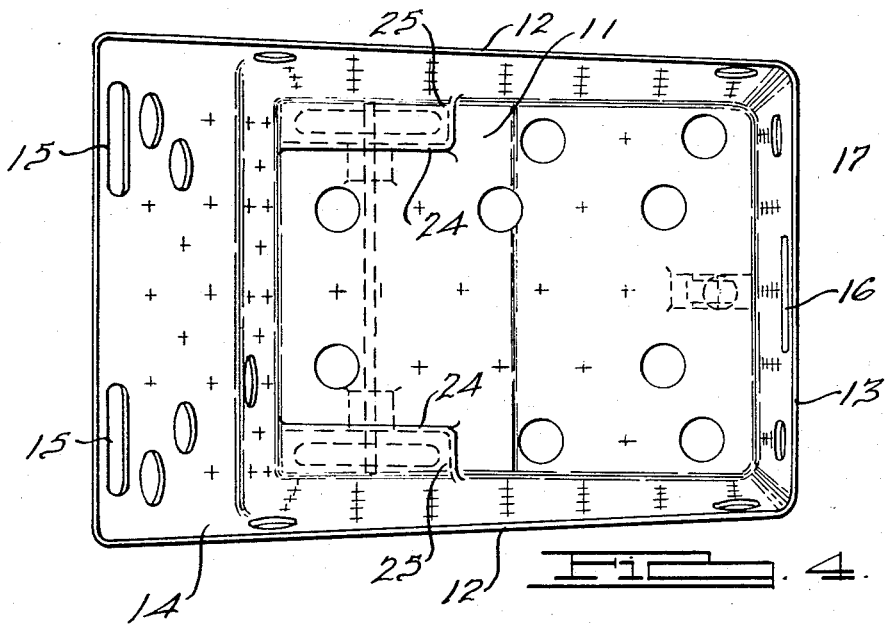
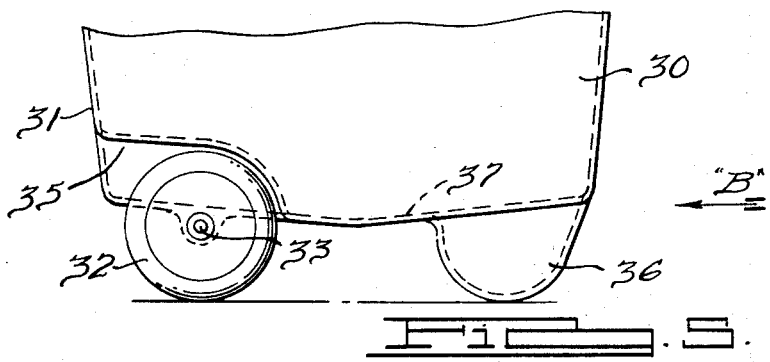
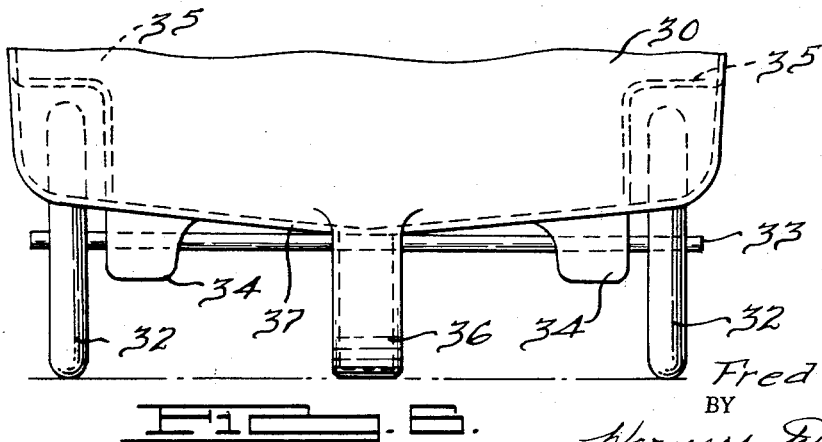
INVENTOR.
Fred E. Parsons.
BY
Harness, Dickey & Pierce
ATTORNEYS.

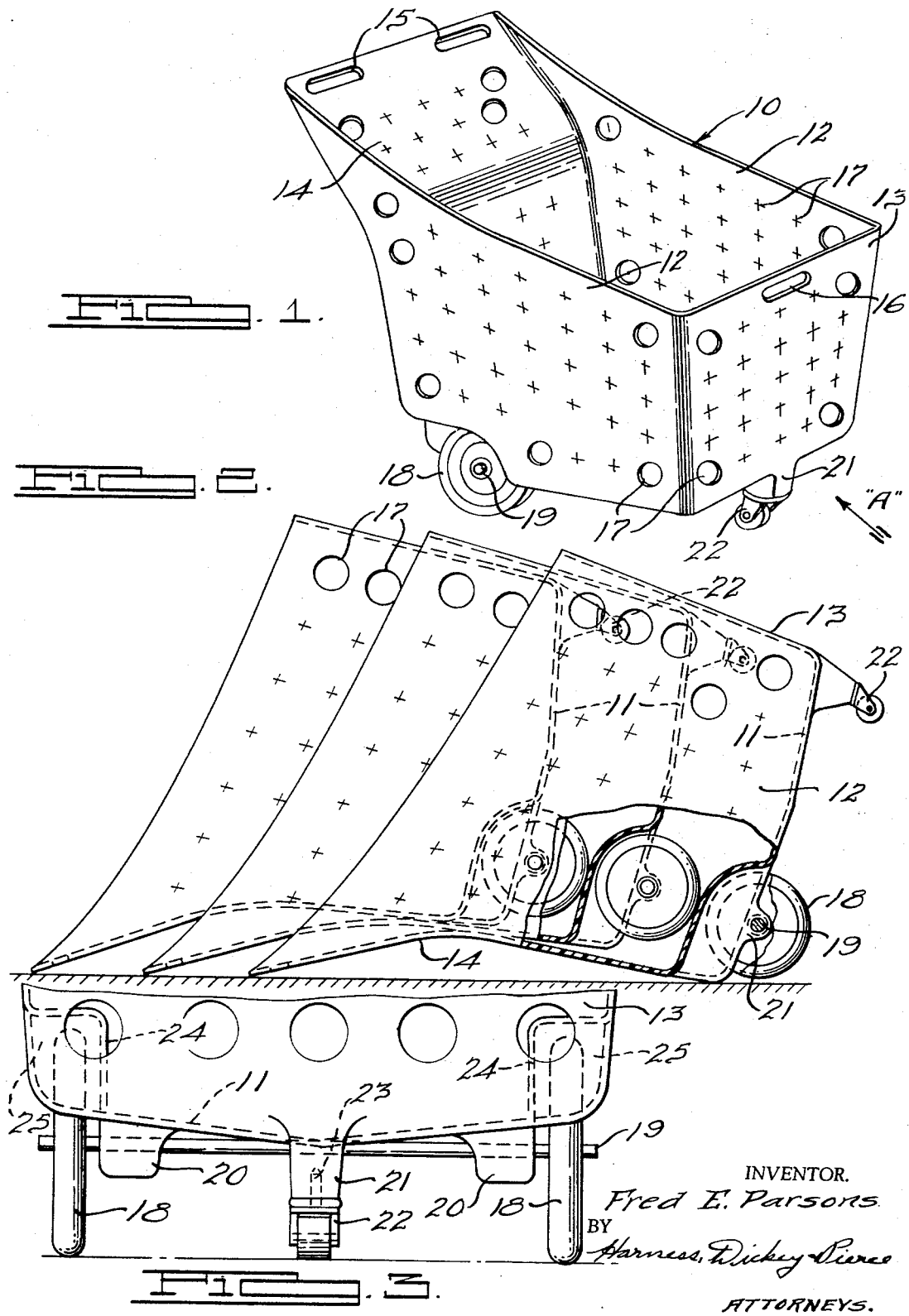

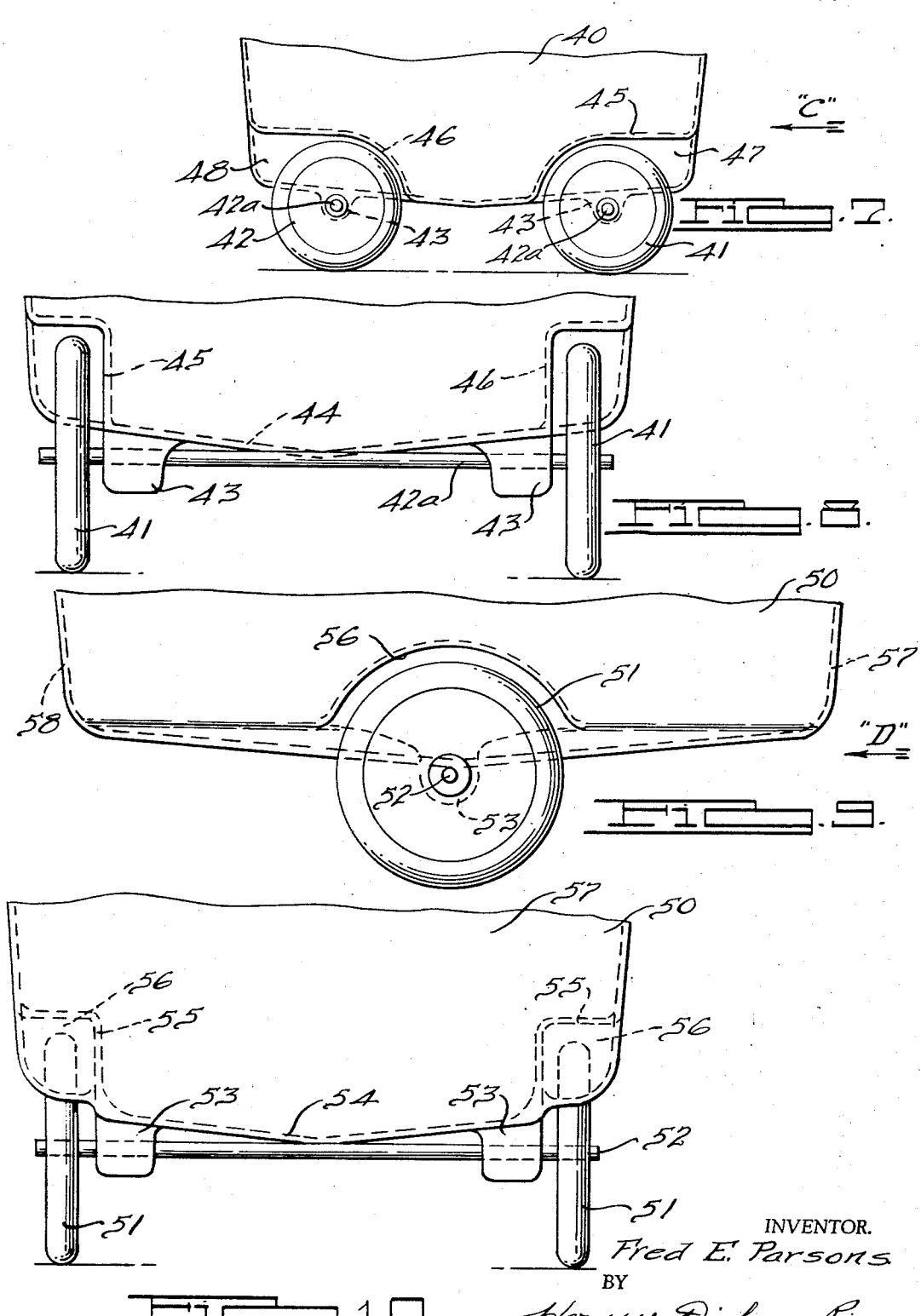

3,346,271
NESTABLE CART OF MOLDED MATERIAL
Fred E. Parsons, 1656 Keller Lane,
Bloomfield Hills, Mich. 48013
Filed July 6, 1965, Ser. No. 469,691
10 Claims. (Cl. 280—33.99)

ABSTRACT OF THE DISCLOSURE

A cart having walls so sloped and supported on wheels so mounted that the body and wheels of one cart nests with the body of a similar cart to a degree that the wheels of the first cart engage the bottom of the body of the second cart.

---

This invention relates to vehicles of the cart type and, more particularly, to a device of this type which may be quickly and easily manufactured and which lends itself to molding whereby it may be made by molding from a suitable plastic material.

While the plastic material may be of any suitable type, it has been found that polystyrene, polyolefin plastics, such as polyethylene and polypropylene; polyester, phenolic, polyvinyl plastics, such as polyvinyl chloride and polyvinylidene chloride and copolymers thereof, produce satisfactory results.

The cart of this invention has many and sundry uses. For example, it may be used to advantage in supermarkets to carry the groceries and other produce from the cashier to the customer's automobile so that the more expensive steel carts now in use in the store may be left in the store. Carts of this type find great utility in yards and gardens in transporting cut grass, leaves, plants, soil and the like from one place to another. The cart is rustproof so that it may be left out in the weather and is light so that it may be readily moved from one place to another.

Therefore, an object of this invention is to provide a manually mobile cart which is of simple construction and may be easily and economically manufactured and quickly assembled and is so reduced in the number and character of its component parts as to approach the ultimate in structural simplicity.

The various objects and advantages, and the novel details of construction of several commercially practical embodiments of the invention, will become more apparent as this description proceeds, especially when considered in connection with the accompanying drawings, in which:

FIGURE 1 is a perspective view of a cart constructed in accordance with this invention;

FIGURE 2 is a side elevational view showing how a number of the carts may be stacked together when the carts are not in use;

FIGURE 3 is an enlarged fragmentary end elevational view of the structure shown in FIGURE 1, looking in the direction of arrow A;

FIGURE 4 is a top plan view of the form of construction shown in FIGURE 1;

FIGURE 5 is a fragmentary side elevational view of a slightly modified form of construction;

FIGURE 6 is an enlarged fragmentary end elevational view of the structure shown in FIGURE 5, looking in the direction of arrow B;

FIGURE 7 is a fragmentary side elevational view of another modified form of construction;

FIGURE 8 is an end view of the structure shown in FIGURE 7, looking in the direction of arrow C;

FIGURE 9 is a fragmentary side elevational view of another modified form of construction; and FIGURE 10 is an end view of the structure shown in FIGURE 9, looking in the direction of arrow D.

As shown in FIGURES 1–4, the device comprises a one-piece body 10 molded from a suitable plastic. The body 10 comprises a bottom 11 (see FIGURES 2 and 4), a pair of spaced upright side portions 12, a front end portion 13 and a rear end portion 14. The rear end portion 14 is curved upwardly and rearwardly to give the device a more graceful appearance. The upper edge of the rear end portion 14 is provided with a pair of handholes 15 by which the cart may be grasped by the operator. The rear curvature of the rear end portion 14 positions the hand openings 15 a sufficient distance rearwardly of the device, so that the operator's feet will not engage the cart when it is being moved. The front end portion 13 is provided with a handhole 16 so that by grasping the handholes 15 and 16, the device may be lifted for emptying.

Inasmuch as one of the objects of this invention is to provide an extremely light cart, the side walls 12 and the end walls 13 and 14 and, if desired, the bottom 11 (FIGURE 4) may be provided with a plurality of apertures 17. This may be conveniently accomplished when the body 10 is molded by providing pins in the mold which will produce the apertures 17. By removing the material normally occupying the apertures 17, the overall weight of the cart can be considerably reduced.

The cart is provided adjacent its rear wall 14 with a pair of wheels 18 which rotate on an axle 19 mounted and secured in bosses 20 formed on the bottom 11 when the device is molded.

Secured to a boss 21 formed on the bottom 11 during the molding and arranged adjacent the front end wall 13 is a caster-like wheel 22. This caster 22 may be of the customary type and freely rotates about its vertical pivot 23 (see FIGURE 3). This caster turns in the direction the operator turns the cart and therefore assists in guiding the cart and improving its maneuverability.

As will be noted from FIGURES 1, 2 and 4, the side walls 12 and the end walls 13 and 14 taper outwardly from the bottom 11 so that when being stored, the carts may be stacked by telescoping one within the other, as shown in FIGURE 2.

Inasmuch as the cart body is formed by casting a suitable plastic material, the bosses 20 and 21 may be formed during the casting operation.

The body 10 adjacent the rear wheels is provided with offset walls 24 forming a space or wheel housing 25 partially enclosing the wheels 18.

In FIGURES 5 and 6, there is a slight modification in which the body 30 is provided adjacent its rear wall 31 with a pair of wheels 32. These wheels are mounted on an axle 33 which is supported on bosses 34 cast with the bottom of the cart. These offset walls 35 are provided to form the wheel housings, as in the previously described construction.

Instead of employing a caster-like wheel, as described in connection with the previous construction, this modification is formed with an enlarged rounded boss 36 which extends from the bottom 37 and is formed when the cart is cast. This boss 36 forms a skid member when the cart is mobilized.

The caster-like wheel 22 in the first described construction and the skid 36 in the second form of construction, cooperate with the rear wheels to provide a support for the body in an upright position when the cart is not being moved. As stated, the caster-like wheel engages the ground to assist in the maneuverability of the cart, as previously explained; whereas, the skid 36 merely slides along the ground when the cart is mobilized.

In the modification shown in FIGURES 7 and 8, the cart 40 is provided with a pair of front wheels 41 and a pair of rear wheels 42. Each set of wheels is mounted on an axle 42a mounted in bosses 43 cast with the bottom 44 of the cart. Offset walls 45 and 46 are provided at both the front and rear of the cart so as to provide wheel housings 47 and 48 for the front and rear wheels.

In the modification shown in FIGURES 9 and 10, the cart 50 is provided with a single set of wheels 51 arranged intermediate the length of the body 50 on an axle 52 supported in bosses 53 cast with the bottom 54 of the cart. The body is also formed with offset walls 55 forming wheel housings 56 for the wheels 51. With this arrangement, the body 50 is balanced on the pair of wheels 51 and may be mobilized or moved in any position when the front end 57 or the rear end 58 does not engage the ground. When the cart is immobilized, it will tilt about the wheels 51 until either the front end 57 or the rear end 58 engages the ground.

In all of the constructions, the bosses for supporting the wheel axles, the boss 21 for supporting the caster-like wheel, the skid shown in FIGURE 5, and the walls forming the wheel housing, may all be cast when the body is cast and will thus form integral parts thereof. If it is desired to lighten any of the constructions shown, the walls and bottom of the body may be formed with a plurality of apertures during molding which will lighten the weight of the device to the extent of the material that is removed by these openings. Thus, it is possible to produce a cart of this type whereby its overall weight is reduced to a minimum. Also, the constructoin of the body and wheel supporting means has been so simplified that the cart may be easily and economically manufactured by molding and quickly assembled. The number and character of the component parts of the cart are such as to approach the ultimate in structural simplicity.

While several commercially practical embodiments of the invention have been described and illustrated herein somewhat in detail, it will be understood that various changes may be made as may come within the purview of the accompanying claims.

What is claimed is:

1. In a cart, a molded one-piece body comprising a bottom and upright side and front and rear end wall portions sloping outwardly toward the top, said sloped walls being smooth to permit one body to nest completely within another body of the same construction, said rear wall portion being provided with an opening forming a handhold whereby the cart may be moved and guided, a pair of wheels mounted on said bottom adjacent said rear wall portion, and a ground engaging member on said bottom adjacent to said front wall portion which together with said wheels provides a support for said body in an upright position.

2. In a cart, a hollow body portion comprising a bottom from which upstanding sides and front and rear end wall slope outwardly, said sloped walls being smooth to permit one body to nest completely within another body of the same construction, said rear end wall having at least one opening forming a handhold by which the device may be moved and guided, a pair of wheels mounted in indentations in the side wall adjacent to said rear end wall, and a caster wheel mounted on said bottom adjacent to said front end wall which together with said wheels provides a support for said body in an upright position.

3. A cart having a body molded from a plastic material containing sides and front and rear end walls extending upwardly and sloping outwardly from a bottom, said sloped walls being smooth to permit one body to nest completely within another body of the same construction, the rear wall being further extended and sloped rearwardly and provided with handhold means near the top, and wheels supported on the bottom of the body.

4. In a cart, a molded one-piece body comprising a bottom, upright side portions, and front and rear end wall portions sloping toward the top, said rear end wall portion being provided with a hand receiving opening whereby the device may be moved and guided, a pair of wheels mounted on said bottom adjacent to said rear end wall portion, and a ground engaging member on said bottom adjacent to said front end wall portion which together with said wheels provides a support for said body in an upright position, said body with the wheels being capable of telescoping within the body of an exact same device with the wheels engaging the bottom thereof.

5. A cart having a body molded from a plastic material containing side and front and rear end walls extending upwardly and sloping outwardly from a bottom, the rear end wall being further extended and sloped rearwardly and provided with handhold means near the top, the opposite sides of said body being indented near the rear end wall, and a wheel supported in each said indentation and engaging the bottom of a similar body when said first body is telescoped therewithin.

6. A cart having a body molded from a plastic material containing side and front and rear end walls extending upwardly and sloping outwardly from a bottom, the rear end wall being further extended and sloped rearwardly and provided with handhold means near the top, the opposite sides of the body being indented midway between the front and rear walls, and a wheel supported in each said indentation and engaging the bottom of a similar body when said first body is telescoped therewithin.

7. A cart having a body molded from a plastic material containing side and front and rear end walls extending upwardly and sloping outwardly from a bottom, the rear end wall being further extended and sloped rearwardly and provided with handhold means near the top, opposite sides of said body being indented, near the front and rear walls, and a wheel supported in each said idnentation and engaging the bottom of a similar body when said first body is telescoped therewithin.

8. A cart having a body molded from a plastic material containing side and front and rear end walls extending upwardly and sloping outwardly from a bottom, the rear end wall being further extended and sloped rearwardly and provided with handhold means near the top, opposite sides of said body being indented, near the rear wall, a wheel supported in each said indentation and engaging the bottom of a similar body when said first body is telescoped therewithin, and a caster wheel supported near the front end wall on the bottom of the body.

9. A cart having a body molded from a plastic material containing side and front and rear end walls extending upwardly and sloping outwardly from a bottom, the rear end wall being further extended and sloped rearwardly and provided with handhold means near the top, apertures through the sides and walls of the body for reducing the weight thereof, and wheels supported on the bottom of the body and engaging the bottom of a similar body when said first body is telescoped therewithin.

10. A cart having a body molded from a plastic material containing side and front and rear end walls extending upwardly and sloping outwardly from a bottom, the rear end wall being further extended and sloped rearwardly and provided with handhold means near the top, opposite sides of said body being indented, near the rear wall, a wheel supported in each said indentation and engaging the bottom of a similar body when said first body is telescoped therewithin, and a skid formed in the bottom adjacent to said front wall.

References Cited

UNITED STATES PATENTS

| | | | |
|---|---|---|---|
| 806,885 | 12/1905 | Focht | 280—47.26 |
| 2,479,530 | 8/1949 | Watson | 280—33.99 |
| 2,563,108 | 8/1951 | Forbes | 280—79.2 |
| 2,676,729 | 4/1954 | Neville et al. | 280—79.2 XR |
| 2,889,152 | 6/1959 | Hurst et al. | 280—47.26 |
| 3,157,871 | 11/1964 | Umanoff | 280—33.99 XR |
| 3,241,850 | 3/1966 | Propst | 280—33.99 |

FOREIGN PATENTS

| | | |
|---|---|---|
| 200,604 | 7/1956 | Australia. |

BENJAMIN HERSH, *Primary Examiner.*

MILTON L. SMITH, *Examiner.*